No. 726,904. PATENTED MAY 5, 1903.
F. T. GILES.
HORSESHOE.
APPLICATION FILED SEPT. 15, 1902.
NO MODEL.
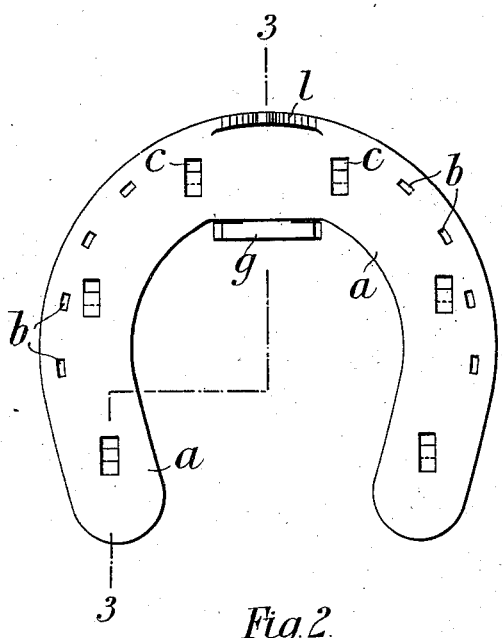
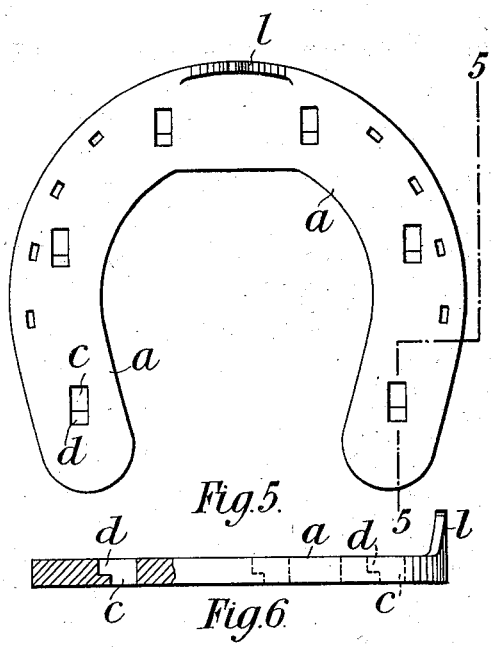
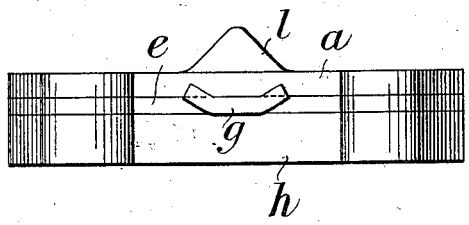
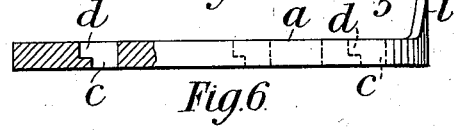
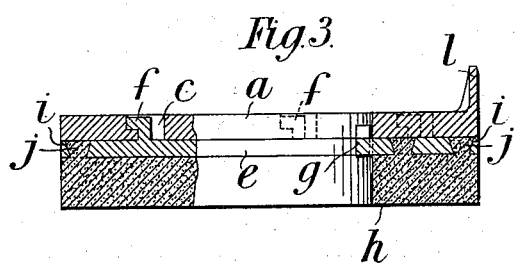
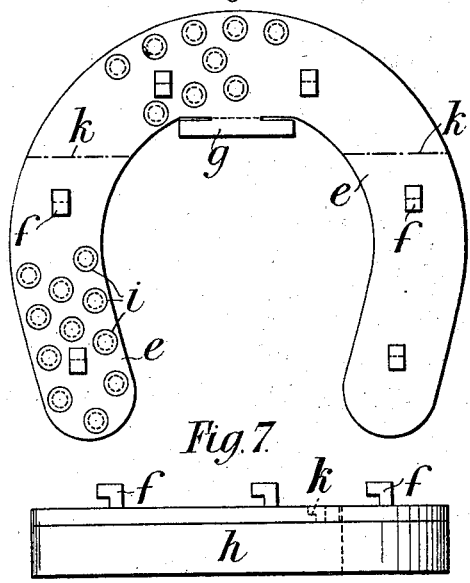
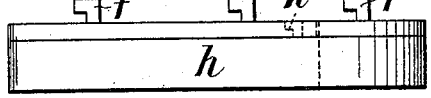
Witnesses:
Inventor:
Frederick T. Giles No. 726,904. Patented May 5, 1903.

UNITED STATES PATENT OFFICE.

FREDERICK THEOPHILUS GILES, OF BRISTOL, ENGLAND.

HORSESHOE.

SPECIFICATION forming part of Letters Patent No. 726,904, dated May 5, 1903.

Application filed September 15, 1902. Serial No. 123,411. (No model.)

*To all whom it may concern:*

Be it known that I, FREDERICK THEOPHILUS GILES, a subject of the King of Great Britain, residing at Durdham Park, Bristol, England, have invented new and useful Improvements in or Connected with Horseshoes, of which the following is a specification.

My invention relates to horseshoes, and chiefly to those of the kind provided with cushions or elastic pads for reducing as much as possible the effects of concussion and to that class of such shoes wherein the cushions or pads can be readily renewed when worn without the necessity for removing the shoe proper from the foot.

A shoe constructed according to my invention comprises two metal plates of approximately the same shape adapted to be locked together by any suitable means and one which (hereinafter termed the "fixed" plate) is designed to be fixed to the hoof by nails in the usual manner, while the other (hereinafter termed the "cushion-plate") is designed for carrying the elastic material or cushion when used.

To enable my invention to be fully understood, I will describe the same by reference to the accompanying drawings, in which—

Figure 1 is a plan view of a horseshoe constructed according to my invention. Fig. 2 is an end view of the same. Fig. 3 is a section on the line 3 3, Fig. 1. Fig. 4 is a plan view of the fixed plate; and Fig. 5 is a section on the line 5 5, Fig. 4. Fig. 6 is a plan view of the cushion-plate, and Fig. 7 is a side view of the same.

$a$ is the fixed plate, which is formed with a series of holes $b\ b$ for the attachment of the same to the hoof by means of nails in the usual manner and with another series of holes $c\ c$, each of which holes is formed with a recessed extension $d$.

$e$ is the cushion-plate, which is of approximately the same shape as the fixed plate $a$ and provided on the upper side with a series of hook or undercut lugs $f\ f$, designed to pass through the holes $c\ c$, and the hooked portions of which lugs, by means of a slight longitudinal movement of the cushion-plate upon the fixed plate, are caused to enter the recesses $d\ d$, as clearly shown in Figs. 1 and 3, in order to lock the two plates together.

In order to prevent the cushion-plate from being inadvertently detached from the fixed plate, the said cushion-plate is provided on the inner edge near the front with a double tongue $g$, the ends of which when the two plates are in their relative position are turned up so as to engage behind the fixed plate, as clearly shown in Fig. 2. It is to be understood, however, that any other suitable means for this purpose may be provided.

$h$ is the elastic material, which is applied to the surface of the cushion-plate, and in order to provide a firm hold for the said material the said cushion-plate is advantageously formed with a series of countersunk holes or recesses $i\ i$ of any suitable size or shape, increasing in diameter from the outer face of the cushion-plate toward the inner or top face thereof, into which holes or recesses the india-rubber or the like enters, as shown at $j\ j$, Fig. 3. In some cases the india-rubber may be extended either wholly or partially over the back of the cushion-plate in addition to the front in order to afford absolute security against the separation of the elastic material from the cushion-plate.

In the drawings the cushion-plate is represented as being made in one piece. It may, however, be formed in sections, if desired, the division in this case being advantageously upon the dot-and-dash lines $k$, Figs. 6 and 7, so that the elastic material may be renewed upon any one of the sections without the necessity for renewing the whole or so that a new section can be applied in place of one removed. It will be understood that with this construction the toe-piece of the cushion-plate has to be removed before the heel-pieces can be taken off.

Although I have described my improved horseshoe as being provided with cushioning material, it is to be understood that such cushioning material may be wholly or partly dispensed with, and in this case the plate $e$ or the uncushioned parts of the same (whether made in one piece or in sections) can be made thicker than otherwise to allow for the wear of the shoe. This arrangement possesses the advantage that it enables the wearing-surface of the shoe or any section to be renewed from time to time until it is absolutely necessary to remove the fixed plate, owing to the growth of the hoof. In cases where a horse wears the toe of the shoe out quickly it may be desirable to make a flange or tongue on the removable or cushion plate (somewhat similar to the usual tongue on the top of the fixed plate, indicated by the letter $l$) extending down to the face of the cushion to take the wear.

Having now particularly described and ascertained the nature of my said invention and in what manner the same is to be performed, I declare that what I claim is—

1. In a horseshoe, the combination with a plate adapted to be attached to the hoof, of a removable plate, said plates having the one projections and the other recesses adapted to be interlocked by moving one of said plates upon the other, one of said plates having a pliable part adapted to be bent into the plane of the other plate to prevent said interlocking devices from being released, substantially as described.

2. In a horseshoe, the combination with a plate adapted to be secured to the hoof, of a removable plate, one of said plates being provided with a series of undercut lugs and the other plate being provided with a series of corresponding holes or recesses adapted to be interlocked with said lugs by the longitudinal movement of said movable plate, said movable plate being provided on the inner edge near the front with pliable portions adapted to be bent into the plane of the other plate, substantially as described.

3. In a horseshoe, the combination with a hoof, a plate adapted to be secured to the hoof, of a removable cushion-plate adapted to be detachably secured to the other plate and provided with a series of holes or recesses increasing in diameter from the outer face of said cushion-plate toward the face adjacent to the hoof-plate, and an elastic cushion united to said cushion-plate and having integral portions thereof filling said holes or recesses, substantially as described.

FREDERICK THEOPHILUS GILES.

Witnesses:
L. I. CORBETT,
E. A. STOCKWELL.